United States Patent
Amon et al.

(10) Patent No.: US 9,710,935 B2
(45) Date of Patent: Jul. 18, 2017

(54) PIXEL-PREDICTION FOR COMPRESSION OF VISUAL DATA

(71) Applicants: Peter Amon, München (DE); Andreas Hutter, München (DE); André Kaup, Effeltrich (DE); Andreas Weinlich, Windsbach (DE)

(72) Inventors: Peter Amon, München (DE); Andreas Hutter, München (DE); André Kaup, Effeltrich (DE); Andreas Weinlich, Windsbach (DE)

(73) Assignee: Siemens Aktiengesellschaft, München (DE)

( * ) Notice: Subject to any disclaimer, the term of this patent is extended or adjusted under 35 U.S.C. 154(b) by 66 days.

(21) Appl. No.: 14/371,473

(22) PCT Filed: Dec. 4, 2012

(86) PCT No.: PCT/EP2012/074301
§ 371 (c)(1),
(2) Date: Jul. 10, 2014

(87) PCT Pub. No.: WO2013/107555
PCT Pub. Date: Jul. 25, 2013

(65) Prior Publication Data
US 2015/0003707 A1 Jan. 1, 2015

(30) Foreign Application Priority Data
Jan. 19, 2012 (EP) .................... 12000308

(51) Int. Cl.
*G06K 9/00* (2006.01)
*G06T 11/00* (2006.01)
(Continued)

(52) U.S. Cl.
CPC ............ *G06T 11/003* (2013.01); *G06T 9/004* (2013.01); *H04N 19/11* (2014.11); *H04N 19/14* (2014.11);
(Continued)

(58) Field of Classification Search
None
See application file for complete search history.

(56) References Cited

U.S. PATENT DOCUMENTS

| 3,813,485 A | 5/1974 | Arps |
| 4,255,763 A | 3/1981 | Maxemchuk et al. |

(Continued)

FOREIGN PATENT DOCUMENTS

| CN | 101292536 A | 10/2008 |
| CN | 101361370 A | 2/2009 |

(Continued)

OTHER PUBLICATIONS

European Search Report and Written Opinion cited in EP 12000308, mailed Jun. 20, 2012.

(Continued)

*Primary Examiner* — Atiba O Fitzpatrick
(74) *Attorney, Agent, or Firm* — Lempia Summerfield Katz LLC

(57) ABSTRACT

The embodiments relate to pixel-prediction methods and devices that are based on one of a selection of one out of at least two model functions that provide a prediction function and an adaptive model function that is capable to predict intensity characteristics of reference pixels used for prediction.

14 Claims, 5 Drawing Sheets

(51) Int. Cl.

| | |
|---|---|
| *G06T 9/00* | (2006.01) |
| *H04N 19/147* | (2014.01) |
| *H04N 19/60* | (2014.01) |
| *H04N 19/11* | (2014.01) |
| *H04N 19/14* | (2014.01) |
| *H04N 19/182* | (2014.01) |
| *H04N 19/189* | (2014.01) |
| *H04N 19/503* | (2014.01) |
| *H04N 19/154* | (2014.01) |

(52) U.S. Cl.
CPC ......... *H04N 19/147* (2014.11); *H04N 19/154* (2014.11); *H04N 19/182* (2014.11); *H04N 19/189* (2014.11); *H04N 19/503* (2014.11); *H04N 19/60* (2014.11)

(56) References Cited

U.S. PATENT DOCUMENTS

| | | |
|---|---|---|
| 5,631,979 A | 5/1997 | Cok |
| 2007/0121731 A1 | 5/2007 | Tanizawa et al. |
| 2009/0232206 A1 | 9/2009 | Boon et al. |

FOREIGN PATENT DOCUMENTS

| | | |
|---|---|---|
| CN | 101815218 A | 8/2010 |
| EP | 1954060 | 8/2008 |

OTHER PUBLICATIONS

International Search Report and Written Opinion cited in PCT/EP2012/074301, mailed Jan. 22, 2013.

Li et al., Edge-Directed Prediction for Lossless Compression of Matural Images, 2001, pp. 813-817, vol. 10, IEEE Transactions on Image Processing.

Marquardt et al., An Algorithm for Least-Squares Estimation of Nonlinear Parameters, 1963, pp. 431-441, vol. 11, No. 2, Journal of the Society for Industrial and Applied Mathematics.

Ruminski et al., Telemedicine Methods for Low Bit Rate Communication, May 2008, pp. 1-4, International Conference on Information Technology.

Shukla et al., A Survey on Lossless Image Compression Methods, 2010, pp. 136-141, vol. 6, International Conference on Computer Engineering and Technology.

Wang et al., Spiral CT Image Deblurring for Cochlear Implantation, Apr. 1998, pp. 251-262, vol. 17, No. 2, IEEE Transaction on Medical Imaging.

Wu et al., Context-Based, Adaptive, Lossless Imaging Coding, Apr. 1997, pp. 437-444, vol. 45, No. 4, IEEE Transaction on Communications.

Xue et al., An Automatic Mode Decision Method for Intra Frame Coding and Decoding, Dec. 2001, International Organization for Standardisation.

Chinese office Action for related Chinese Application No. 201280067484.0 dated Aug. 1, 2016, with English Translation.

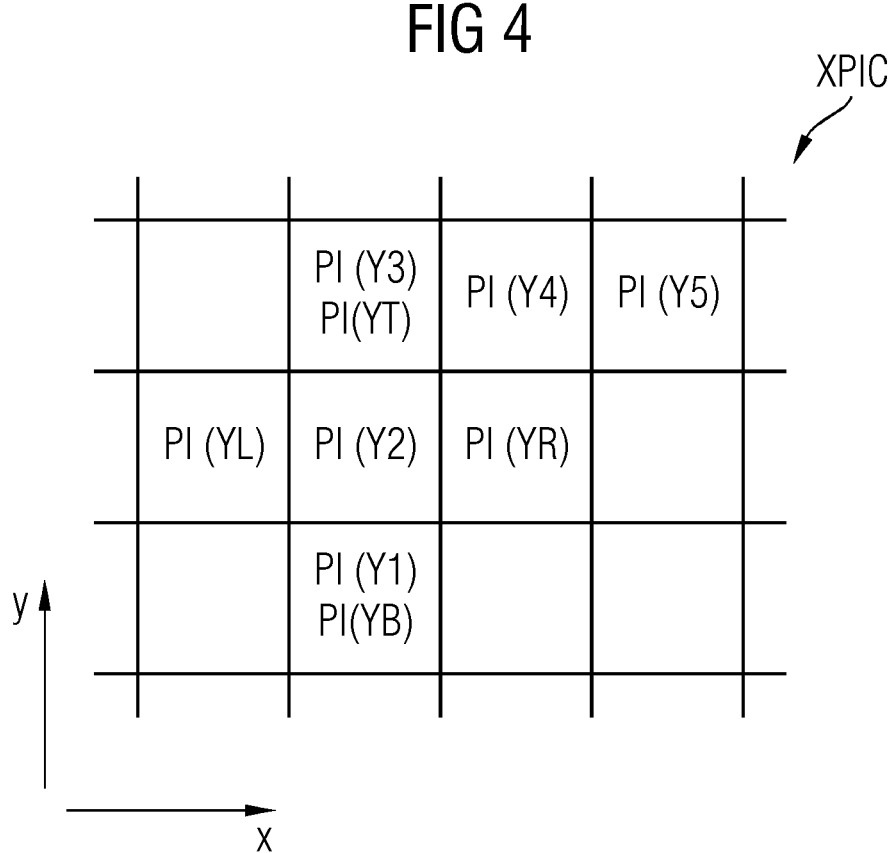

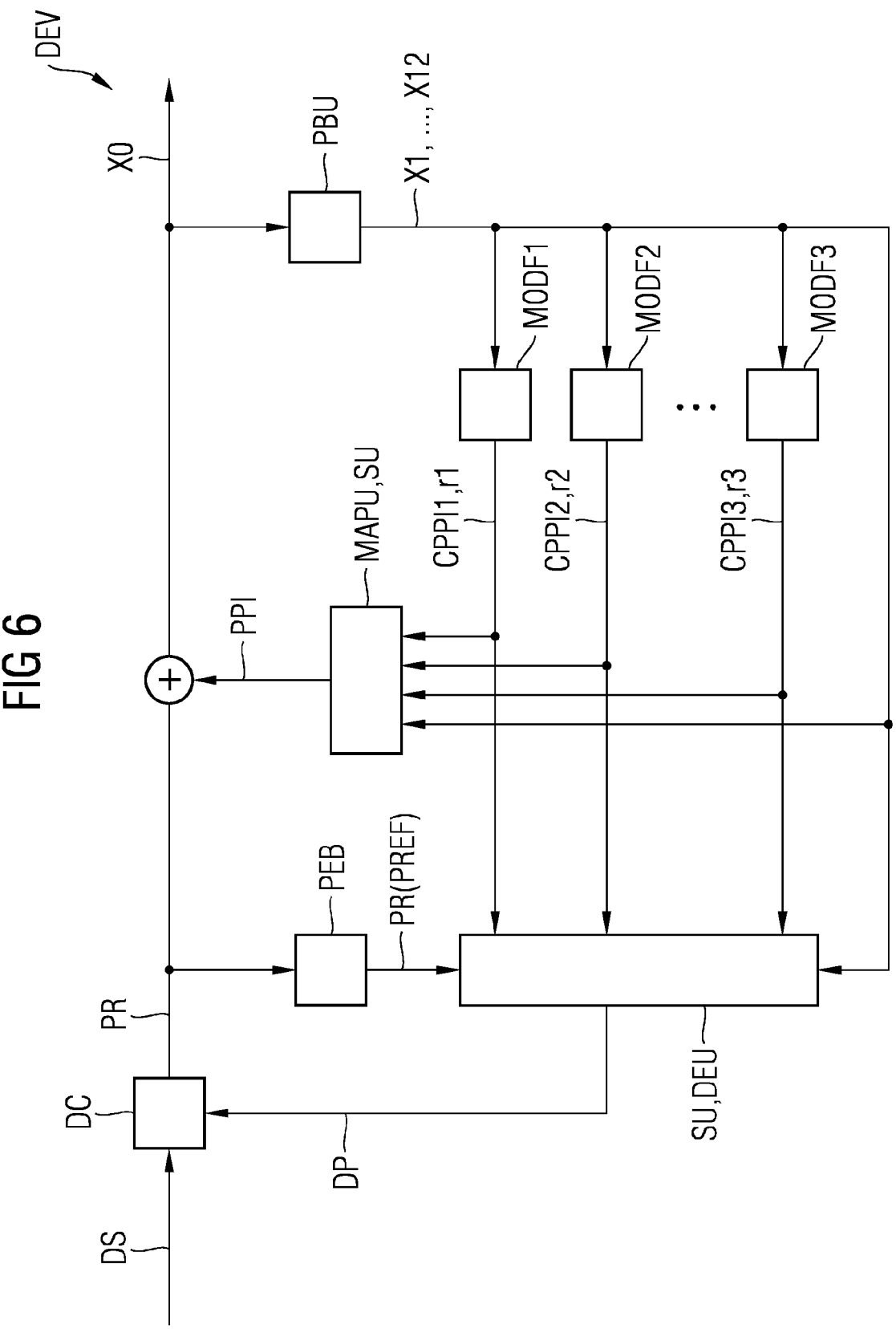

PIXEL-PREDICTION FOR COMPRESSION OF VISUAL DATA

CROSS-REFERENCE TO RELATED APPLICATIONS

The present patent document is a §371 nationalization of PCT Application Serial Number PCT/EP2012/074301, filed Dec. 4, 2012, designating the United States, which is hereby incorporated by reference, and this patent document also claims the benefit of EP 12000308.2, filed on Jan. 19, 2012, which is also hereby incorporated by reference.

BACKGROUND

For fast and efficient transmission and storage of visual pixel data, compression algorithms are applied to exploit their spatial and probabilistic redundancies. Bit rate reduction may be accomplished by mostly reversible data transforms for signal energy reduction and subsequent entropy coding. In predictive methods, the transform includes a subtraction of prediction values from each pixel that may also be obtained at a decoder. If prediction values do not match the true pixel values precisely, energy reduction fails and entropy coding may not noticeably reduce data rate. The current prediction models may not work well for image data with particular edge characteristics (e.g., ultrasound images or computed tomography (CT) slices that represent images of cutting planes through a human body where density of tissue has been mapped to gray level values).

On the other hand, with increasing resolution of medical imaging scanners (e.g., in CT acquisitions) as well as with upcoming teleradiologic diagnosis, more and more attention is paid to medical image compression techniques. Furthermore, physicians often demand lossless compression due to legal restrictions or when diagnostic decisions depend on the image data.

A simple solution to the prediction problem is linear prediction from neighborhoods. The pixels of an image are submitted subsequently in order to make a prediction based on already received pixels. The pixels may be traversed in line-scan order so that upper and left pixels may be used to form the predictor. A certain region of such pixels around the pixel to be predicted is defined as so called "neighborhood" or "context." For linear prediction, a weight is assigned to each pixel-position of the context. Each pixel within the neighborhood is multiplied with its corresponding weight and the results are summed up to get the prediction. One example of linear prediction is differential pulse-code modulation (DPCM) where the pixel left of the current pixel gets the weight of one and is therefore directly taken as a prediction value. More complicated methods may optimize the weights for a specific image using least squares regression (e.g., with the Yule-Walker equation) and transmit the weights as side information. Recent approaches also seek to compute the weights from previously transmitted pixel values or even adapt the weights for each pixel individually in order to save the side information.

The JPEG-LS (Joint Picture Expert Group, Lossless) algorithm, which is a lossless/near-lossless compression standard for continuous-tone images, is based on the LOCO-I (LOw COmplexity LOssless COmpression for Images) algorithm. More recent approaches like a CALIC (Content-based, Adaptive, Lossless Image Codec) algorithm use non-linear predictions for better exploitation of transient signals. These algorithms may be rules to compute a prediction value by incorporating image structure like edges.

As an example, the median predictor used in LOCO-I works as follows. As a prediction, the LOCO-I algorithm takes the smaller value of the upper and the left pixel if both pixels are smaller than the upper left pixel, the larger value if both pixels are larger than the upper left pixel, and the sum of both pixels minus the upper left pixel otherwise. Another type of non-linear prediction includes image structures described by neighborhood templates and corresponding prediction values. The prediction values from all templates are weighted according to how well the templates fit the current observation and then summed up for the final prediction.

Both JPEG-LS and CALIC algorithms make use of context modeling after prediction in order to adapt to observed larger-scale image characteristics. At each pixel, features are extracted from its neighborhood, which are then used to classify the pixel to a certain context group. In JPEG-LS, these features are quantized image gradients from neighborhood positions. CALIC uses combined features including sign patterns of the neighborhood intensity values minus the current non-linear prediction. While decoding, for each context group, a value of the mean observed prediction error at pixels belonging to that context group is maintained. In this way, for each new pixel prediction, the prediction error may be corrected by the mean prediction error from previous pixels sharing the same context group.

In U.S. Pat. No. 5,631,979, a predictor is generated by weighted summation of the outcome of several calculation units using values of supported pixels.

SUMMARY AND DESCRIPTION

The scope of the present invention is defined solely by the appended claims and is not affected to any degree by the statements within this summary. The present embodiments may obviate one or more of the drawbacks or limitations in the related art.

The objective is to provide methods and devices that allow a more precise prediction of pixels of visual data.

One embodiment relates to a first method for coding or reconstructing a pixel intensity of a pixel, by generating predicted pixel intensity, where the pixel is part of an image. The method includes: (1) selecting at least one reference pixel from pixels of the image, where the respective reference pixel was coded previously; (2) providing a model function that (a) provides a specific prediction method for generating a predicted pixel intensity candidate based on the respective intensity of one or more reference pixels, and (b) represents an adaptive rule for generation of the predicted pixel intensity candidate, where the adaptive rule is based on the intensity characteristics of the reference pixels; (3) setting the predicted pixel intensity candidate of the pixel based on the model function as the predicted pixel intensity; and (4) coding or reconstructing the pixel intensity of the pixel based on the predicted pixel intensity.

Another embodiment relates to a second method for coding or reconstructing a pixel intensity of a pixel, by generating predicted pixel intensity, where the pixel is part of an image, The method includes: (1) selecting at least one reference pixel from pixels of the image, where the respective reference pixel was coded previously; (2) providing at least two different model functions that provide a specific prediction method for generating a predicted pixel intensity candidate based on the respective intensity of one or more reference pixels; (3) selecting one of the model functions as selected model function, where (a) the selection is based on the predicted pixel intensity candidate, (b) the selection is performed without knowledge of the pixel intensity of the pixel, and (c) the selected model function represents intensity characteristics of the reference pixels better than any other of the model functions; (4) setting the predicted pixel intensity candidate of the pixel based on the selected model function as the predicted pixel intensity; and (5) coding or reconstructing the pixel intensity of the pixel based on the predicted pixel intensity.

It is an advantage of both methods that prediction precision is superior in regions that comply with the shape of the assumed model function. With appropriate subsequent entropy coding, this leads to higher compression ratios or less distortions in lossy compression.

Another advantage includes the small neighborhood region that is defined by the reference pixels that are needed for accurate predictions. Apart from smaller buffer sizes, this is useful for small images like in region-of-interest coding, for different image characteristic within the same image, as well as for the first transmitted region of an image where not much context information is available. Also, parallel implementations may more readily be accomplished as the dependency on other image regions is not as large as in other schemes.

Last, the embodiments are not restricted to 2-D images but may also be used, e.g., in 3-D volumes, hyperspectral images, or videos. For all data sets where the characteristics are known beforehand, few model-functions are sufficient to cover a large number of realizations of these structures, e.g., an almost infinite number of edge directions.

By using the selected model function that represents intensity characteristics of the reference pixels better than any other of the model functions, it is the expectation of the selection, performed by a mapping unit, that the selected model function will deliver a more accurate prediction of the predicted pixel intensity than any of the other modal functions. The prediction by the model function that uses the adaptive rule will be executed after optimization of the respective model function in respect to the reference pixels.

In an extension of the second method, at least one of the model functions represents a static rule for generation of the predicted pixel intensity. This allows a low complex implementation and low complex calculation of the predicted pixel intensity because the model function is a static function.

In an extension of the second method, at least one of the model functions represents an adaptive rule for generation of the predicted pixel intensity candidate, where the adaptive rule is based on the intensity characteristics of the reference pixels. The adaptive rule allows a more precise prediction of the pixel to be coded, because the adaptive rule's function may be dynamically configured to the specific intensity characteristics of the reference pixels.

In an optional extension as the adaptive rule, the model function may be optimized by a residual error that is minimized in order to generate at least one parameter that is used to adapt the model function to the intensity characteristics of the reference pixels, where the residual error describes the difference between the predicted pixel intensity candidate at the position of the reference pixels and the intensity of reference pixels. This extension allows a precise adaptation of the model function to the intensity characteristics of the reference pixels.

In one optional example, the model function describes a two dimensional pattern for the intensity characteristics of the reference pixels. Using a two-dimensional pattern improves the prediction of the predicted pixel intensity enormously. In particular, this example may be realized by the model function for an edge in the intensity characteristics that is described by $$pq(X) = o + \frac{s}{2}\left(1 + \text{erf}\left(\frac{x\cos(\phi) - y\sin(\phi)}{\sqrt{2}\,\sigma} - d\right)\right)$$

where:
  pq: defining the predicted pixel intensity candidate (CPPI1) at position X, e.g., with x and y dimension;
  erf( ): is the Gaussian error function, a scaled version of an indefinite integral over a 1-D Gaussian function;
  d: shifting by a distance d;
  ϕ: rotating by an angle in the X-plane;
  o: offset;
  s: multiplying with scale s; and
  σ: amount of smoothing.

The parameters may be optimized to the reference pixels by:

$$(d, \phi, o, s, \sigma)^T = q = \underset{q}{\operatorname{argmin}}\left(\sum_{k=1}^{n}(wk(PI(Xk) - pq(Xk)))^2\right)$$

where:
  wk: weighting factors;
  k: specific position of reference pixel Xk; and
  n: number of reference pixels.

This realization of the model function provides a precise prediction in the case that the intensity characteristics of the reference pixels indicate one intensity edge.

In an alternative solution, the embodiment may be realized by the model function for two edges in the intensity characteristics that is described by:

$$pq2(X) = o + \frac{s}{2}(\text{erf}(t) - \text{erf}(t - \delta))$$

$$t = \frac{x\cos(\phi) - y\sin(\phi)}{\sqrt{2}\,\sigma} - d`$$

where:
  pq: defining the predicted pixel intensity candidate (CPPI1) at position X, e.g., with x and y dimension;
  erf( ): is the Gaussian error function, a scaled version of the indefinite integral over a 1-D Gaussian function;
  d: shifting by a distance d;
  ϕ: rotating by an angle in the X-plane;
  o: offset;
  s: multiplying with scale s;
  σ: amount of smoothing; and
  δ: distance between the two edges.

This realization of the model function provides a precise prediction in the case that the intensity characteristics of the reference pixels indicate two intensity edges.

In an extension of the methods, the reference pixels are one of: (a) pixels in their original form, and (b) pixels that are reconstructed after coding. By using the pixels on their original form the method requires less calculation power that for the case that uses reconstructed pixel. However, using reconstructed pixels may result in a higher compression rate after coding the pixel than using then in their original form.

In another extension of the methods, at least some of the reference pixels are adjacent pixels of the pixel. Using adjacent pixels as reference pixels improves the precision of the prediction further as the highest similarity in the pixel intensity may be found in the adjacent pixels.

In an extension of the second method and optional one of its extensions, a mismatch value of the respective model function is generated, where the mismatch value defines the difference between the predicted pixel intensity candidate at the position of the reference pixels and the intensity of reference pixels respectively and the selected model function shows the smallest mismatch value compared to other mismatch values. By using the mismatch value, a simple method is used to select one of the model functions for generating the predicted pixel intensity.

In another extension of the second method and optional one of its extensions, at least one model function is discarded before executing the selection, where the selection is performed, if either a difference between pixel intensity candidates of two different model functions exceeds a definable first threshold or the mismatch value of the respective model function exceeds a second threshold. By this extension, the selection is further simplified.

In an extension, the act of coding includes a selection of probability distributions used for entry coding by an entropy coder of a prediction error that is based on a subtraction of the predicted pixel intensity from the pixel intensity of a pixel, where the selection includes the use of respective prediction errors of previously coded pixels, e.g., reference pixels, of the image. By using this extension, a compression rate while coding the pixel intensity may be improved.

In particular, if the act of selecting a probability distribution is based on at least one of the pixel intensity candidates or of the mismatch values of the respective model function the compression rate while coding the pixel intensity is further improved.

The methods may be applied to the intensity that is based on the luminance, chrominance or color channels as red, green, and blue of the respective pixel.

The embodiments also relate to a first device for coding and reconstructing a pixel intensity of a pixel, by generating predicted pixel intensity where the pixel is part of an image. The first device includes: (1) a pixel buffer unit for selecting at least one reference pixel from pixels of the image, where the respective reference pixel was coded previously; (2) a model function that (a) provides a specific prediction method for generating a predicted pixel intensity candidate based on the respective intensity of one or more reference pixels, and (b) represents an adaptive rule for generation of the predicted pixel intensity candidate, where the adaptive rule is based on the intensity characteristics of the reference pixels; (3) a mapping unit for setting the predicted pixel intensity candidate of the pixel based on the model function as the predicted pixel intensity; and (4) a coding unit for coding or reconstructing the pixel intensity of the pixel based on the predicted pixel intensity.

The embodiments also relate to a second device for coding or reconstructing pixel intensity of a pixel, by generating predicted pixel intensity, where the pixel is part of an image. The second device includes: (1) a pixel buffer unit for selecting at least one reference pixel from pixels of the image, where the respective reference pixel was coded previously; (2) at least two different model functions for providing a specific prediction method for generating a predicted pixel intensity candidate based on the respective intensity (PI) of one or more reference pixels; (3) a mapping unit for selecting one of the model functions as selected model function, where (a) the selection is based on the predicted pixel intensity candidate, (b) the selection is performed without knowledge of the pixel intensity of the pixel, and (c) the selected model function represents intensity characteristics of the reference pixels better than any other of the model functions, and sets the predicted pixel intensity candidate of the pixel based on the selected model function as the predicted pixel intensity; and (4) a coding unit for coding or decoding the pixel intensity of the pixel based on the predicted pixel intensity.

In an extension of the first and/or second device, the respective devices cover a supplementary unit for implementing and performing at least one of the extension acts as described previously.

The first and second devices depict similar advantages as the corresponding methods.

BRIEF DESCRIPTION OF THE DRAWINGS

FIG. 4 depicts an example of an interpolated image with new pixels from the image.

FIG. 5 depicts an embodiment of a result of selection of three different model functions to be used for prediction of an intensity of a pixel.

FIG. 6 depicts an embodiment of a flow diagram for predicting pixel intensity using an encoding device.

Elements with similar functions and effects use the same reference signs.

DETAILED DESCRIPTION

With increasing resolution of computed tomography (CT) acquisitions, as well as with upcoming teleradiologic diagnosing, more and more attention is paid to medical image compression techniques. Physicians often demand lossless compression due to legal restrictions or when diagnostic decisions depend on the image data.

Most image compression algorithms make use of either transform-based methods like in JPEG (Joint Picture Expert Group) 2000 or prediction-based methods like in JPEG-LS to exploit inter-pixel dependencies. The DICOM (Digital Imaging and Communications in Medicine) standard, which is used as a container format in medical imaging today, may store both transform-based methods and prediction-based methods. With some exceptions, transform-based methods are better suited for quantization and therefore lossy compression while prediction leads to higher compression ratios in lossless coding. This is why a JPEG-LS algorithm performs better than JPEG 2000 in most lossless setups. However, since the LOCO-I algorithm of JPEG-LS has been developed, more recent algorithms were proposed, achieving considerably better compression.

Figure 1:
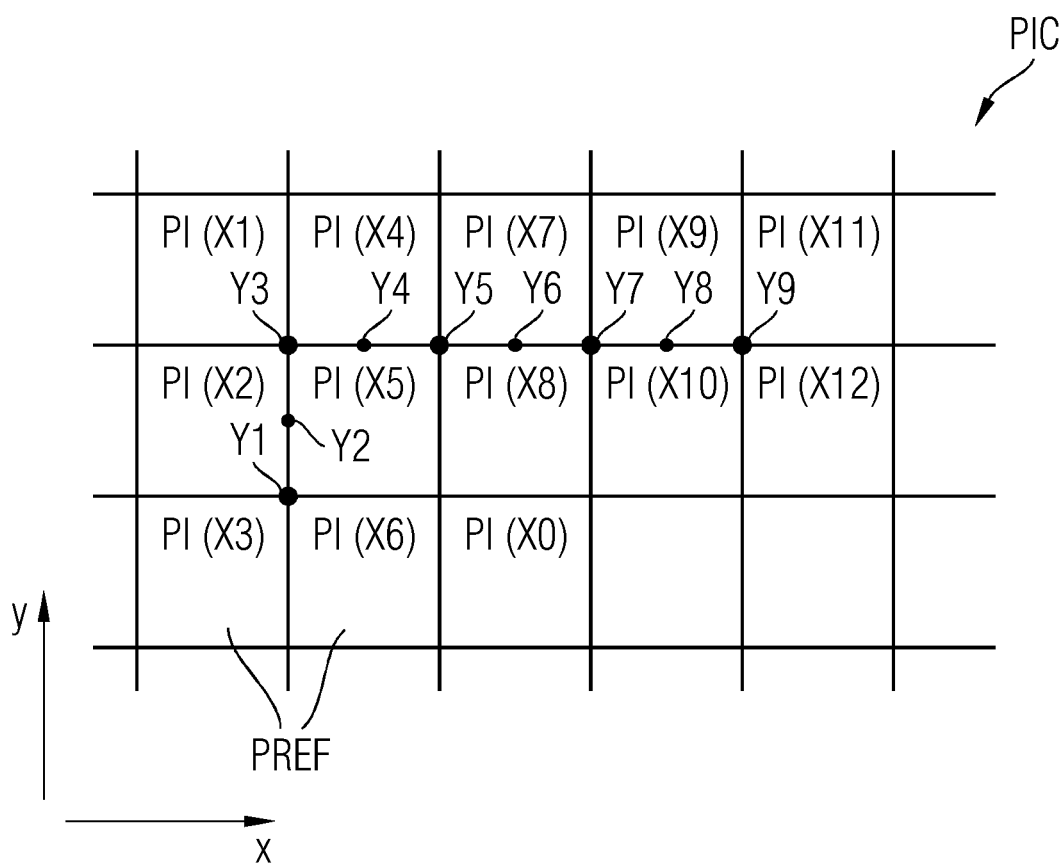
FIG. 1 depicts an example of an arrangement of pixels within an image.

An example used for reference is CALIC (Context-Based, Adaptive, Lossless Image Coding). Both JPEG-LS and CALIC start by traversing the image PIC in line-s may order, making initial predictions PPI at each pixel position X0, defined by two dimensions (x, y) of the image PIC, based on reference pixels, such as a causal pixel-neighborhood, as depicted in FIG. 1. Reference pixels are pixels of the image PIC that were coded previously. Intensities of reference pixels at image positions X1, . . . , X12 are referred to as PI(X1), ..., PI(12). The better each intensity (value) PI(X0) may be predicted, the smaller the amount of prediction error (PR=PI(X0)−PPI) becomes, and the lower the number of bits to be transmitted after entropy coding becomes.

JPEG-LS uses the non-linear median predictor. As a prediction, JPEG-LS takes the smaller value of PI(X6) and PI(X8) if both values are smaller than PI(X5), the larger value if both values are larger than PI(X5), or the sum of both minus PI(X5) otherwise.

CALIC applies a more complicated gradient-adjusted prediction (GAP) using an estimate of gradient strength and direction of PI at X0 to make a decision how to predict PPI.

As these predictors are not capable of capturing all pixel-dependencies, in a context modeling act, a bias gets subtracted from PI(X0)-PPI based on the mean experienced prediction error at pixels with similar neighborhood characteristics in precedent image regions. Another class of algorithms based on least-squares adaptive prediction schemes was able to outperform such approaches by adapting to larger-region image characteristics already during prediction.

At the same time, a strong dependence on adaptation to previously transmitted image regions is a drawback of all of these methods. Apart from requiring large image buffers for the adaptation, this leads to bad predictions when not enough context is given (e.g., at the top of an image or in the vicinity of image boundaries). Forward adaptive methods may partly work around these problems by transmitting considerable amount of side-information. Such restrictions render the methods less useful for scenarios where, e.g., only small images have to be sent lossles sly like in region of interest (ROI) coding for teleradiology. On the other hand, a median or GAP predictor alone may only give inaccurate predictions.

Figure 2:
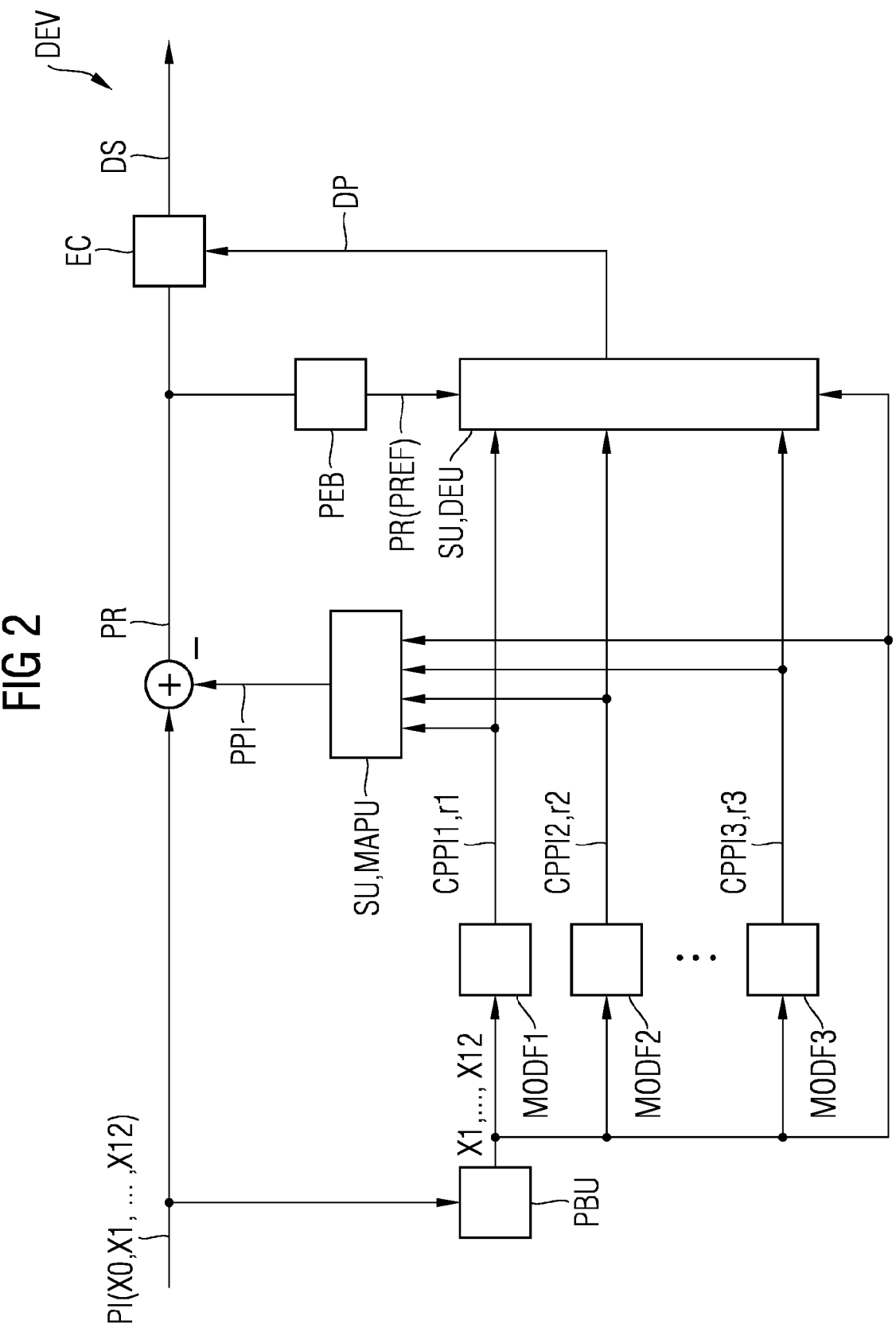
FIG. 2 depicts an embodiment of a flow diagram for predicting pixel intensity using an encoding device.

FIG. 2 depicts an encoding device ENC configured to perform the method. Incoming pixel intensities PI of pixels X0, ..., X12 of the image PIC are stored into a pixel buffer PBU. The pixel buffer PBU provides at least one reference pixel. A predicted pixel intensity PPI for the pixel X0 may be predicted based on the intensity of reference pixels PREF that are formed by the pixels X1, ..., X12 (see FIG. 1). These reference pixels are forwarded to respective model functions MODF1, MODF2, MODF3. The model function MODF2 is a static function that does not change based on the characteristics of the reference pixels. A predicted pixel intensity candidate CPPI2 of the model function MODF2 sets the predicted pixel reference PPI by the following equation:

$$PPI = CPPI2(X0) = \frac{1}{12}\sum_{z=1}^{12} PI(Xz) \quad (1)$$

In contrast, the model function MODF1 is an adaptive model function. This indicates that the model function MODF1 adapts its structure to the specific characteristics of the reference pixels.

The model functions may be continuous model-functions with a function $f: \mathbb{R}^n \to \mathbb{R}^c$, where n represents the n-dimension of the reference data, (e.g., n=2 for x and y). Such functions may approximate certain structures within the pixel data, where c may be for example the number of color channels. Using interpolation schemes, discrete functions may be used instead of continuous functions. Naturally, structure in pixel data may vary in different regions or data sets. This variation is to be incorporated in the function f via parameters. Afterwards the functions f are fit to the intensity function of already transmitted pixel values within the neighborhood, represented by the reference pixels, with respect to an objective function like the sum of squared differences (SSD), (e.g., the SSD between known intensity function and f is minimized). The fitting may be done with an arbitrary linear or non-linear optimization or regression method. A prediction candidate is obtained from each function by sampling the best fits at the position of the unknown value. In order to gain the final prediction value, a function of the prediction candidates is used. This function may depend on all information the decoder is aware of. Examples of information include the quality of the fits (residuals from optimizations), pixel data characteristics within the neighborhood like gradients or functions of them, differences between prediction candidates, or statistics from previous fittings.

Example 1 for Model Function MODF1 with Adaptive Function:

The characteristics of medical CT images are different to photographs or computer-generated images in some aspects. The images are colorless and gray-levels reflect tissue densities. Gray-level resolution may be 12 bit. Data sets may be noisy due to restricted X-ray radiation dose. And last, there is almost never a slow, large-scale gray-level change since tissue is mostly not mixed. Rather, there are sharp edges occurring between different organs while intensity within an organic region is constant except for noise. During the acquisition and reconstruction process, these sharp edges get blurred.

Blurring may be modeled as a convolution of the sharp image with a symmetric 2-D Gaussian kernel function.

$$g(X) = \frac{1}{2\pi\sigma^2} e^{-\frac{x^2+y^2}{2\sigma^2}} \quad (2)$$

where $X=(x,y)^T$ denotes the position of the pixel in the image and σ the amount of smoothing. An ideal vertical edge may be modeled by the Heaviside function:

$$h(X) = \begin{cases} 0, & x < 0 \\ 1, & x \geq 0 \end{cases} \quad (3)$$

Figure 3:
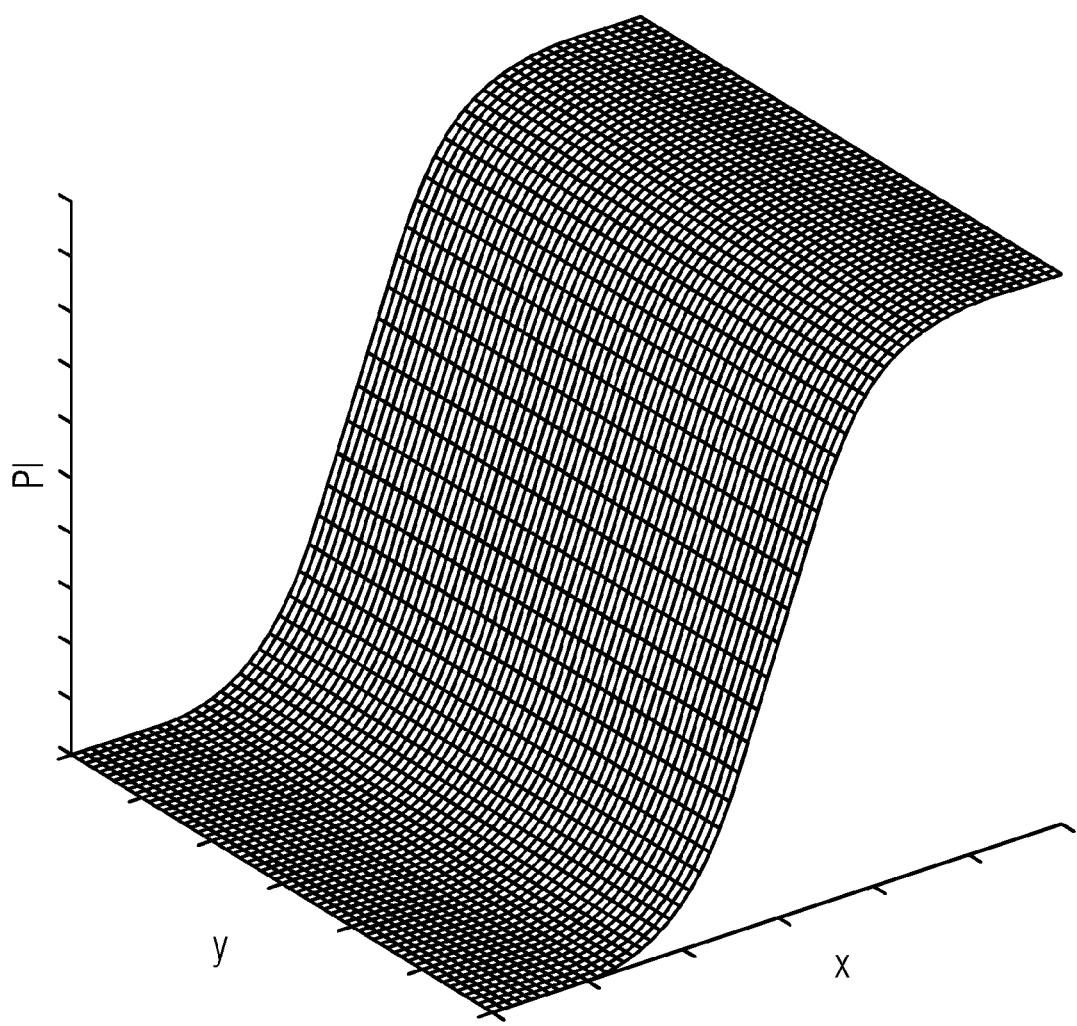
FIG. 3 depicts an embodiment of a two-dimensional error function used by one of the model functions.

A blurring of this edge results in the 2-D convolution:

$$(g*h)(X) = \int_{-\infty}^{\infty}\int_{-\infty}^{\infty} h(x-u, y-v)g(u,v)\,dv\,du = \quad (4)$$

$$\int_{-\infty}^{x} \frac{1}{\sqrt{2\pi}\,\sigma} e^{\frac{u^2}{2\sigma^2}} du = \frac{1}{2}\left(1 + \text{erf}\left(\frac{x}{\sqrt{2}\,\sigma}\right)\right)$$

where erf( ) is the Gaussian error function, a scaled version of the indefinite integral over a 1-D Gaussian function, which may not be written in closed form. FIG. 3 depicts an example of such a function.

Other edge positions may be represented in shifting the Heaviside function by a distance d or rotating it by an angle φ in the X-plane. Other types of edges may be obtained by adding an offset o or by multiplying with scale s. Due to linearity and shift-invariance of convolution as well as symmetry and normality of the Gaussian, these transforms are equally adopted by the error function after convolution. It may be assumed that the curvature of an edge is negligible in a small vicinity of the predicted pixel. Hence, an edge pq=CPPI1 in this vicinity may be described using the five parameters q=(d, ϕ, o, s, σ)$^T$:

$$pq(X) = o + \frac{s}{2}\left(1 + \text{erf}\left(\frac{x\cos(\phi) - y\sin(\phi)}{\sqrt{2}\,\sigma} - d\right)\right) \quad (5)$$

For the prediction of an intensity value, it is assumed that the twelve reference pixels in the neighborhood around the current pixel were transmitted in advance in line-scan order as depicted in FIG. 1. Afterwards, the five edge parameters are determined in a way that the corresponding artificial edge pq best fits these observations PI(Xk), e.g., the sum of squared differences, called residual r, is minimized:

$$(d, \phi, o, s, \sigma)^T = q = \underset{q}{\text{argmin}}\left(\sum_{k=1}^{12}(wk(PI(Xk) - pq(Xk)))^2\right) \quad (6)$$

where the differences are weighted according to their inverse Euclidean pixel-distance from the pixel to be predicted:

$$(wk)_{k \in \{1 \ldots 12\}} = \quad (7)$$
$$\left(\frac{1}{\sqrt{8}}, \frac{1}{\sqrt{5}}, \frac{1}{2}, \frac{1}{\sqrt{5}}, \frac{1}{\sqrt{2}}, 1, \frac{1}{2}, 1, \frac{1}{\sqrt{5}}, \frac{1}{\sqrt{2}}, \frac{1}{\sqrt{8}}, \frac{1}{\sqrt{5}}\right)$$

in order to get a more precise fit near X0 as these pixels normally have higher significance for the prediction. To solve this nonlinear least-squares optimization problem, the Levenberg-Marquardt algorithm may be used.

This procedure yields an analytic description for a local image-edge approximation, estimated from already transmitted intensity values. The predicted pixel intensity PPI may be obtained by evaluating the predictor function pq at position X0.

Example 2 for Model Function MODF3 with Adaptive Function:

The model function as described in Example 1 for a single edge does not hold when the distance of two edges at a thin structure is no longer large with respect to a, the convolution has a combined impact on both edges. However, the previous model function may be generalized to the two-edges case when it is assumed that these edges are parallel like it is valid for CT images. The Heaviside function h(x, y) in the convolution has to be replaced by a difference of two Heaviside functions h(x,y)-h(x-δ,y) where δ is the distance between both edges. This results in an integration within [x-δ,x] instead of [-∞,x] and thus in a modified edge function for two edges:

$$pq2(X) = o + \frac{s}{2}(\text{erf}(t) - \text{erf}(t - \delta)) \quad (8)$$
$$t = \frac{x\cos(\phi) - y\sin(\phi)}{\sqrt{2}\,\sigma} - d$$

It is noted that δ is incorporated into the minimization as a sixth parameter. When the prediction of this method is accepted at each position where it yields a lower residual r than the previous approach, a small prediction error may be achieved.

Further on, optimized initialization values for the six parameters (d,ϕ,o,s,σ,δ)$^T$ are provided. Five of the parameters are not critical. When X8 is chosen as the coordinate origin, s, d, and δ may initially be set to zero. The offset o may be set to a mean gray value and σ may be given an arbitrary value σ=1/√2. The only parameter critical for convergence is the gradient angle ϕ. In the one-edge model function, a mean gradient direction may be computed from the gradients at the twelve neighborhood pixels, e.g., using finite differences. This is no longer possible for the two edges model function, because due to the opposite gradient directions at both edges, the gradients would cancel each other out. A solution is to understand the x and y-components of these gradients as random variables and compute the main principal direction from their estimated 2×2 autocorrelation matrix. This may be done using the direction of the eigenvector that corresponds to the largest eigenvalue, which has a closed solution for 2×2 matrices.

Example for a Model Function MODF2 with a Static Function:

The above two model functions were designed to predict pixels on image edges since simpler methods achieve only poor results here. Apart from computational complexity, there is another reason why the model functions may not be applied in homogeneous regions. If there is no significant edge, these two algorithms try to fit the error function to the noise structure of the context. This is an overfitting and leads to arbitrary prediction values that may be different from the neighborhood. For such cases, a linear prediction is sufficient. A weighted linear combination of context values may be used where the weights ak for PI(Xk) are determined by solving Yule-Walker equations on CT data before their quantization to mostly inverse powers of two. For non-boundary pixels, these are:

$$(ak)_{k \in \{1 \ldots 12\}} = \quad (9)$$
$$\left(-\frac{1}{\sqrt{16}}, 0, -\frac{1}{16}, \frac{1}{16}, -\frac{1}{4}, \frac{3}{4}, -\frac{1}{8}, 1, \frac{1}{2}, 0, \frac{1}{8}, -\frac{1}{\sqrt{16}}, \frac{1}{8}\right)$$

For the mapping function from predicted pixel intensity candidates CPPI1, . . . , CPPI3 to the final predicted pixel intensity PPI, one choice is to check which fit achieves the smallest residual and use its prediction as the final pixel intensity. The predicted pixel intensity candidates and optional residuals r1, r2, r3, also called mismatch value, from the respective modeling functions are fed into a mapping function unit MAPU. The mapping function unit MAPU may either combine the candidates to a final prediction or merely select one of the prediction values based on this information and the original reference pixel information. The respective mismatch value defines the difference between the predicted pixel intensity candidate at the position of the reference pixels and the intensity of reference pixels respectively and the selected model function such as:

$$r1 = \left(\sum_{k=1}^{12}((PI(Xk) - pq(Xk)))^2\right) \quad (10)$$

Even so, the predicted pixel intensity candidates may be weighted according to a function of the residuals (e.g., the inverse). When different model functions are used for different local image characteristics like edges and homogeneous regions, a function of the neighborhood identifying the image characteristic (like the sum of gradient lengths) may be used to weight the contribution from these predicted pixel intensity candidates. Another option is to use a mean prediction value where predicted pixel intensity candidates differing too much from the others are discarded at the outset. Last but not least, predicted pixel intensity candidates may be weighted, e.g., according to the inverse prediction error they would have caused during the preceding pixel data transmission in case they would have been used exclusively up to the current position.

In practical implementations, this prediction approach may be combined with various other predictors. For medical computed tomographic acquisitions, the prediction approach may make sense to use the error function fitting in edge regions while applying an existing approach in homogeneous regions. Existing approaches range from linear predictions towards context modeling techniques like realized in JPEG-LS (LOCO-I) or in CALIC. The decision for a model function may, for example, be made based on thresholds for gradient lengths within the reference pixels or neighborhood of the pixel P, for residuals from optimization and, at the same time, for the difference between the predicted pixel intensity candidates. Either these thresholds are fixed for a certain type of data or they may be determined anew for each data set, e.g., by checking each possible combination of them for their optimality.

When using the model functions described by the three examples above, the following may be applied to decide on one of the mapping function to be used for generating the predicted pixel intensity PPI. This decision is based on checks of: (1) gradient lengths within the neighborhood represented by the reference pixels, (2) differences between the predictions, and (3) residuals of error function fitting.

The dimensions (x,y) of the image PIC with the pixels X are extended by a factor of 2 receptively. In FIG. 1, the position of new pixels Y1, ..., Y9 is marked by bubbles. The new pixels are located on half-pixel positions of the pixels in the image PIC. An extended image XPIC uses Y to define the new pixels in the two dimensions (x,y). In FIG. 4, the extended image with the respective new pixels Y1, ..., Y5 may be seen, where each pixel position depicts the respective intensity PI. The intensity of the new pixels Y are calculated based on the pixel X using, e.g., an interpolation method.

Nine gradients are computed at positions Y1, ..., Y9. This computation is based the intensity of new pixels arranged at neighboring pixel at top, right, bottom, and left to the respective new pixel position Y1, ..., Y9. An example of these neighboring pixels YT, YR, YB, YL are in FIG. 4 for Y2.

The computation is provided in the equation below.

$$\sum_{k=1}^{9} [(YR(k) - YL(k))^2 + (YB(k) - YT(k))^2] > TG \quad (11)$$

The computation may be applied only if error function fitting is performed at all. TG is called third threshold. Whether to use the one-edge or two-edge prediction value is decided based on which method achieved the lower optimization residual r. After the optimizations, outliers may effectively be sorted out by secondly checking the predictions deviation from the simple linear prediction. If |CPPI1−CPPI2|>TP, for example, for a given reference pixel or a set of reference pixels, it is probably an outlier. TP is called first threshold. Additionally, the predictions may neither be accepted at positions not compliant with the edge model (identified by high residuals r>TR). TR is called second threshold. At all these positions where error-function fitting is not useful, only linear prediction is used instead. FIG. 5 depicts how such an automatic decision by the mapping unit MAPU may look like for respective pixels. B indicates two-edge prediction by MODF3 may be used, A indicates one-edge prediction by MODF1, and C regions only linear prediction is to be applied with MODF2 model functions.

After providing the predicted pixel intensity, a coding of respective pixel takes place. This may be performed by generating the prediction error PR by PR=PI(X0)−PPI(XO). Entropy coding by an entropy encoder EC may be applied to the prediction error for data reduction. High efficiency may be achieved when, in addition to the prediction value, the probability distribution of the prediction error is also estimated within a distribution estimation unit DEU. For example, the distribution estimation unit DEU is a supplementary unit SU. Therefore, previously generated prediction errors are temporarily stored in a prediction error buffer PEB. An option is to use Laplacian distribution with zero mean and a variance estimated from the prediction errors within the reference pixels. This variance estimate or other features like reference pixel gradients may also be used to decide for an appropriate coding context for a context adaptive arithmetic coder that adapts the probability distributions DP for each context from previously observed prediction errors PR(PREF) like used in CALIC.

Before entropy coding, transform coding (e.g., using a discrete cosine transform or a wavelet transformation) of the residual error or quantization may be applied. Transform coding may remove remaining dependencies within the residual error, while quantization may reduce the data rate for lossy coding. In case quantization is applied, pixel reconstruction at the encoder is performed before an additional prediction act in order to avoid drift between encoder and decoder.

The final data stream DS may be transmitted to a data storage or receiver for decoding and viewing the coded image.

In moving pixel data sets like videos motion estimation of different forms may be applied to adapt context regions to the motion resulting in better exploitation of the temporal redundancies.

Prediction is not only useful for compression, but may also be applied in other scenarios. Examples are defect pixel interpolation, error concealment, noise removal, or super-resolution where the embodiments are as useful as in the compression use case.

An overview of the decoding process is depicted in FIG. 6. Decoding is essentially an inverse operation of encoding. The block diagram may be gained from the encoder diagram by inverting the direction of the arrows in the upper row, replacing the entropy encoder with an entropy decoder and the difference by a summation. It is assumed that the pixel buffer is already filled with enough values to be able to output the first set of reference pixel intensities. Afterwards, a number of model functions are fit to the reference pixels to gain predicted pixel intensity candidates and associated fitting residuals. Like at the encoder, other prediction methods may be applied in the same way. A mapping function unit combines the candidate values to form a prediction pixel intensity the same way as the encoder. The probability distribution is formed by the distribution estimation unit that enables the entropy decoding by the entropy decoder unit DC of the first prediction error value. This error value is buffered and added to the prediction pixel intensity that results in the first decoded pixel value. The pixel value is stored in the pixel buffer and triggers the output of the next neighborhood for function fitting where the chain is invoked once again until all pixel data is decoded.

In an implementation and verification of the described acts, the three thresholds were set, e.g., as follows: (1) First threshold TP=1/20, (2) Second threshold TR=1/1000, and (3) Third threshold TG=1/80.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for coding a pixel intensity of a pixel of an image, the method comprising:
   selecting at least one reference pixel from pixels of the image, wherein the selecting comprises use of respective prediction errors of previously coded pixels;
   providing a model function that (a) provides a specific prediction method for generating a predicted pixel intensity candidate based on the respective intensity of one or more reference pixels, and (b) uses an adaptive rule for generating the predicted pixel intensity candidate, wherein the adaptive rule is based on intensity characteristics of the reference pixels;
   setting the predicted pixel intensity candidate for the pixel based on the model function as a predicted pixel intensity; and
   coding the pixel intensity of the pixel based on the predicted pixel intensity, wherein the coding comprises selecting probability distributions used for entry coding by an entropy coder of a prediction error that is based on a subtraction of the predicted pixel intensity from the pixel intensity of the pixel.

2. The method as claimed in claim 1, wherein the model function uses a residual error that is minimized in order to generate at least one parameter that is used to adapt the model function to the intensity characteristics of the reference pixels,
   wherein the residual error describes a difference between the predicted pixel intensity candidate at a position of the reference pixels and the intensity of the reference pixels.

3. The method as claimed in claim 2, wherein the model function describes a two-dimensional pattern for the intensity characteristics of the reference pixels.

4. A method for coding or reconstructing a pixel intensity of a pixel of an image, the method comprising:
   selecting at least one reference pixel from pixels of the image, wherein the respective reference pixel was coded previously;
   providing a model function that provides a specific prediction method for generating a predicted pixel intensity candidate based on the respective intensity of one or more reference pixels, and uses an adaptive rule for generating the predicted pixel intensity candidate, wherein the adaptive rule is based on intensity characteristics of the reference pixels;
   setting the predicted pixel intensity candidate for the pixel based on the model function as a predicted pixel intensity; and
   coding or reconstructing the pixel intensity of the pixel based on the predicted pixel intensity,
   wherein the predicted pixel intensity candidate is:

$$pq(X) = o + \frac{s}{2}\left(1 + \text{erf}\left(\frac{x\cos(\phi) - y\sin(\phi)}{\sqrt{2}\,\sigma} - d\right)\right)$$

wherein:
pq is the predicted pixel intensity candidate at position X;
erf( ) is a Gaussian error function, a scaled version of the indefinite integral over a 1-D Gaussian function;
d is a distance of shifting;
$\phi$ is an angle of rotation in an X-plane;
o is an offset factor;
s is a scaling factor; and
$\sigma$ is an amount of smoothing.

5. A method for coding or reconstructing a pixel intensity of a pixel of an image, the method comprising:
   selecting at least one reference pixel from pixels of the image, wherein the respective reference pixel was coded previously;
   providing a model function that provides a specific prediction method for generating a predicted pixel intensity candidate based on the respective intensity of one or more reference pixels and uses an adaptive rule for generating the predicted pixel intensity candidate, wherein the adaptive rule is based on intensity characteristics of the reference pixels;
   setting the predicted pixel intensity candidate for the pixel based on the model function as a predicted pixel intensity; and
   coding or reconstructing the pixel intensity of the pixel based on the predicted pixel intensity,
   wherein the predicted pixel intensity candidate is:

$$pq2(X) = o + \frac{s}{2}(\text{erf}(t) - \text{erf}(t - \delta))$$

$$t = \frac{x\cos(\phi) - y\sin(\phi)}{\sqrt{2}\,\sigma} - d$$

wherein:
pq is the predicted pixel intensity candidate at position X;
erf( ) is a Gaussian error function, a scaled version of the indefinite integral over a 1-D Gaussian function;
d is a distance of shifting;
$\phi$ is an angle of rotation in an X-plane;
o is an offset factor;
s is a scaling factor; and
$\sigma$ is an amount of smoothing.

6. The method as claimed in claim 1, wherein the reference pixels are either (a) pixels that are in an original form or (b) pixels that are reconstructed after coding.

7. The method as claimed in claim 1, wherein at least some of the reference pixels are adjacent pixels of the pixel.

8. The method of as claimed in claim 2, wherein a mismatch value of each respective model function is generated,
wherein the mismatch value defines the difference between the predicted pixel intensity candidate at the position of the reference pixels and the intensity of reference pixels respectively, and
wherein a selected model function reports a smallest mismatch value compared to other mismatch values.

9. The method as claimed in claim 8, further comprising:
discarding at least one model function before selecting one of the model functions when a difference between pixel intensity candidates of two different model functions exceeds a definable first threshold or the mismatch value of the respective model function exceeds a second threshold.

10. The method as claimed in claim 8, wherein the selecting of the probability distributions is based on at least one of the pixel intensity candidates or at least one of the mismatch values of the respective model function.

11. The method as claimed in claim 1, wherein the intensity is based on a luminance of the respective pixel.

12. A device for coding and reconstructing a pixel intensity of a pixel of an image, the device comprising:
a pixel buffer unit for selecting at least one reference pixel from pixels of the image, wherein the respective reference pixel was coded previously;
a model function that (a) provides a specific prediction method for generating a predicted pixel intensity candidate based on the respective intensity of one or more reference pixels, and (b) represents an adaptive rule for generation of the predicted pixel intensity candidate, wherein the adaptive rule is based on intensity characteristics of the reference pixels;
a mapping unit for setting the predicted pixel intensity candidate for the pixel based on the model function as a predicted pixel intensity;
a coding unit for coding or reconstructing the pixel intensity of the pixel based on the predicted pixel intensity; and
a distribution estimation unit configured to estimate a probability distribution of a prediction error of the predicted pixel intensity.

13. The method as claimed in claim 4, wherein parameters d, φ, o, s, and σ are optimized to the reference pixels by:

$$(d, \phi, o, s, \sigma)^T = q = \underset{q}{\mathrm{argmin}}\left(\sum_{k=1}^{n}(wk(PI(Xk) - pq(Xk)))^2\right)$$

wherein:
wk is a weighting factor;
k is a specific position of reference pixel Xk; and
n is a number of reference pixels.

14. The method as claimed in claim 1, wherein the model function describes a two dimensional pattern for the intensity characteristics of the reference pixels.

\* \* \* \* \*